United States Patent
Baruschke et al.

(10) Patent No.: US 6,615,595 B2
(45) Date of Patent: Sep. 9, 2003

(54) METHOD AND SYSTEM FOR CONTROLLING A COMPRESSOR

(75) Inventors: Wilhelm Baruschke, Wangen (DE); Thomas Gerken, Stuttgart (DE); Hans-Joachim Krauss, Stuttgart (DE); Ottokar Kunberger, Korntal-Muenchingen (DE); Sascha Lindauer, Altdorf (DE); Karl Lochmahr, Vaihingen (DE); Michael Sickelmann, Stuttgart (DE)

(73) Assignee: Behr GmbH & Co., Stuttgart (DE)

( * ) Notice: Subject to any disclaimer, the term of this patent is extended or adjusted under 35 U.S.C. 154(b) by 0 days.

(21) Appl. No.: 10/059,319

(22) Filed: Jan. 31, 2002

(65) Prior Publication Data

US 2002/0100285 A1 Aug. 1, 2002

(30) Foreign Application Priority Data

Jan. 31, 2001 (DE) ......................... 101 04 507

(51) Int. Cl.[7] ................................ B60H 1/32
(52) U.S. Cl. ....................... 62/133; 62/228.3
(58) Field of Search ................ 62/133, 126, 129, 62/130, 208, 209, 228.1, 228.3, 228.4, 228.5, 229, 243, 323.1, 323.4

(56) References Cited

U.S. PATENT DOCUMENTS

| | | | | |
|---|---|---|---|---|
| 5,285,649 A | * | 2/1994 | Yamanaka et al. | 62/323.1 X |
| 5,385,029 A | * | 1/1995 | Yamanaka et al. | 62/133 |
| 5,893,272 A | * | 4/1999 | Hanselmann et al. | 62/133 |
| 5,924,296 A | * | 7/1999 | Takano et al. | 62/228.3 X |
| 6,336,335 B2 | * | 1/2002 | Ota et al. | 62/228.3 X |
| 6,393,849 B1 | * | 5/2002 | Takenaka et al. | 62/209 X |

FOREIGN PATENT DOCUMENTS

| | | |
|---|---|---|
| DE | 198 22 615 | 1/2000 |
| DE | 199 03 556 | 11/2000 |
| DE | 100 51 582 | 5/2001 |

OTHER PUBLICATIONS

Recknagel et al., "Taschenbuch für Heizung und Klima Technik", R. Oldenbourg–Verlag, 1999, ISBN 3–486–26215–7, pp. 1771–1787.

* cited by examiner

*Primary Examiner*—Harry B. Tanner
(74) *Attorney, Agent, or Firm*—Foley & Lardner

(57) ABSTRACT

The invention relates to a method and system for controlling a compressor in a refrigerant circuit of an air-conditioning system of a motor vehicle. The instantaneous load torque is determined and compared with a maximum limiting torque prescribed by an engine controller, and the compressor is controlled depending on the comparison value resulting therefrom. In order to avoid complete shutdown of the compressor, the instantaneous load torque is represented as a function of variables, such as compressor speed and high pressure of the refrigerant, and, using an inverted function belonging to this function, a control signal for the compressor, for example, a set-point value for the high pressure of the refrigerant, is determined as a function of the maximum limiting torque and employed to control the compressor.

23 Claims, 2 Drawing Sheets

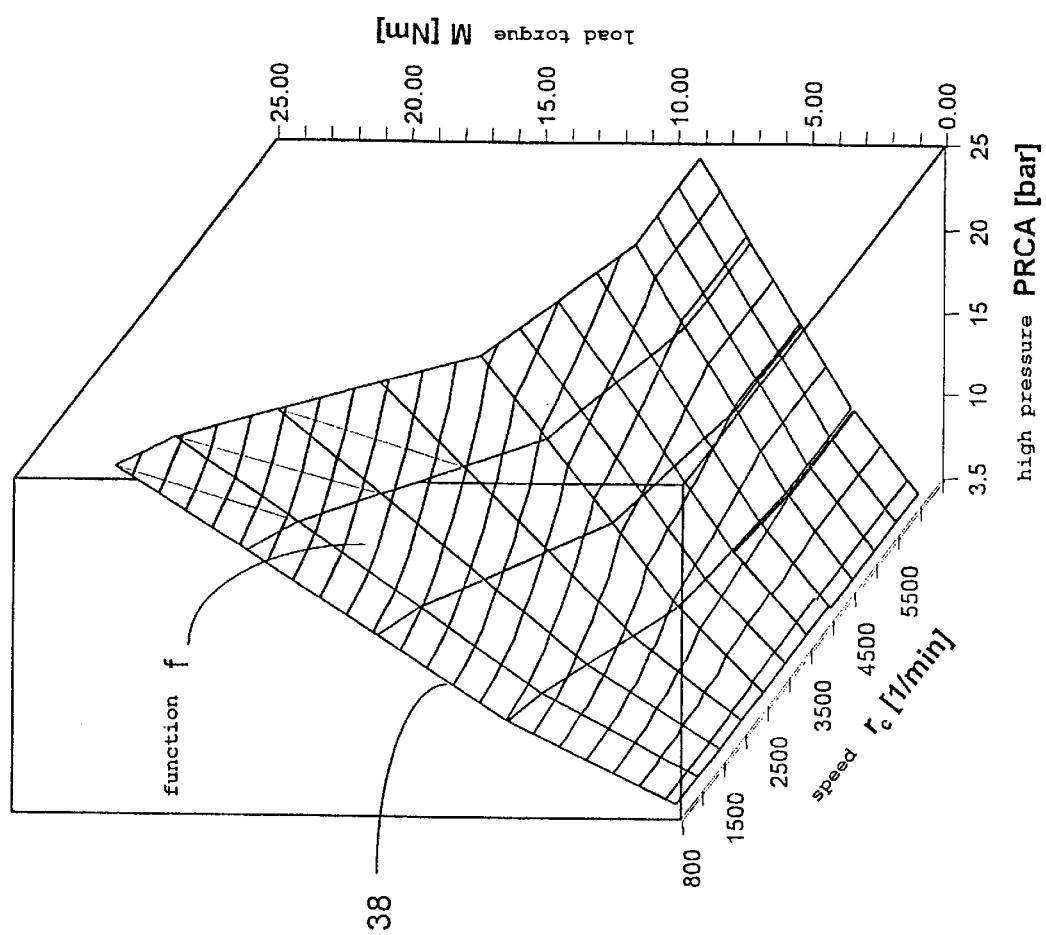

METHOD AND SYSTEM FOR CONTROLLING A COMPRESSOR

CROSS-REFERENCE TO RELATED PATENT APPLICATIONS

The right of priority under 35 U.S.C. § 119(a) is claimed based on German Patent Application No. 101 04 507.7, filed Jan. 31, 2001, the entire disclosure of which is hereby incorporated by reference.

BACKGROUND OF THE INVENTION

The present invention relates to a method and system for controlling a compressor of a refrigerant circuit of an air-conditioning system of a motor vehicle.

The invention is based on the general problem that, in certain driving states, in which the vehicle engine has to produce a high power, for example, in the case of driving at high altitude or the case of sharp acceleration, the power output to the compressor of the refrigeration circuit of an air-conditioning system will be restricted. In the case of today's air-conditioning systems, torque restriction caused by the driving situation is recognized, and the engine control device or the transmission control device completely shuts down the compressor. The instantaneous load torque is determined by a computer, with the aid of a function obtained by simulation and testing. It is possible for this function to depend on variables, such as high pressure of the refrigerant, compressor speed, activating rate of the set point, voltage of the blower motor of an air-conditioning device and the like.

A disadvantage of this known control system and method for limiting the load torque of the compressor is that a complete shutdown of the compressor takes place, with the result that the air-conditioning system cannot operate in the driving situations described. This leads to a loss in passenger comfort.

SUMMARY OF THE INVENTION

One object of the invention is, therefore, to provide an improved method and control system for controlling a compressor in an automotive air-conditioning system, such that the above-mentioned disadvantages can be avoided.

Another object of the invention is to provide an improved automotive air-conditioning system embodying the control system of the invention.

In accomplishing these and other objects, there has been provided in accordance with one aspect of the present invention a method for controlling a compressor in a refrigerant circuit of an air-conditioning system in a motor vehicle driven by an engine, comprising: determining an instantaneous load torque (M) of the compressor as a function (f) of at least one variable; determining a predetermined maximum limiting torque ($M_{limit}$) as a function (f) of at least one variable and based on parameters set by a controller of the engine; comparing M with $M_{limit}$, and if M>$M_{limit}$; using an inverted function ($f_{inv}$) which is derived from function (f) to generate a control signal for the compressor based on $M_{limit}$; and controlling the compressor based at least in part on the generated control signal.

In accordance with another aspect of the invention, there has been provided a control system for controlling a compressor in a refrigerant circuit of an air-conditioning system in a motor vehicle driven by an engine, comprising: a circuit for determining an instantaneous load torque (M) of the compressor as a function (f) of at least one variable, wherein function (f) is stored in a look-up table; a circuit for determining a predetermined maximum limiting torque ($M_{limit}$) as a function (f) of at least one variable and based on parameters set by a controller of the engine; a comparator for comparing M with $M_{limit}$; a circuit for generating, when M>$M_{limit}$ and using an inverted function ($f_{inv}$) which is a derivative of function (f), a control signal for the compressor based on $M_{limit}$; and a control circuit for controlling the compressor based at least in part on the generated control signal.

In accordance with yet another aspect of the invention, there is provided a motor vehicle driven by an engine, comprising an air-conditioning system having a refrigerant circuit including a compressor, and a control system for controlling the compressor as defined above.

Further objects, features and advantages of the present invention will become apparent from the detailed description of several preferred embodiments that follows, when considered together with the accompanying figures of drawing.

BRIEF DESCRIPTION OF THE DRAWINGS

In the drawings:

FIG. 2 is a characteristic diagram or map for determining the load torque.

DETAILED DESCRIPTION OF THE PREFERRED EMBODIMENTS

Figure 1:
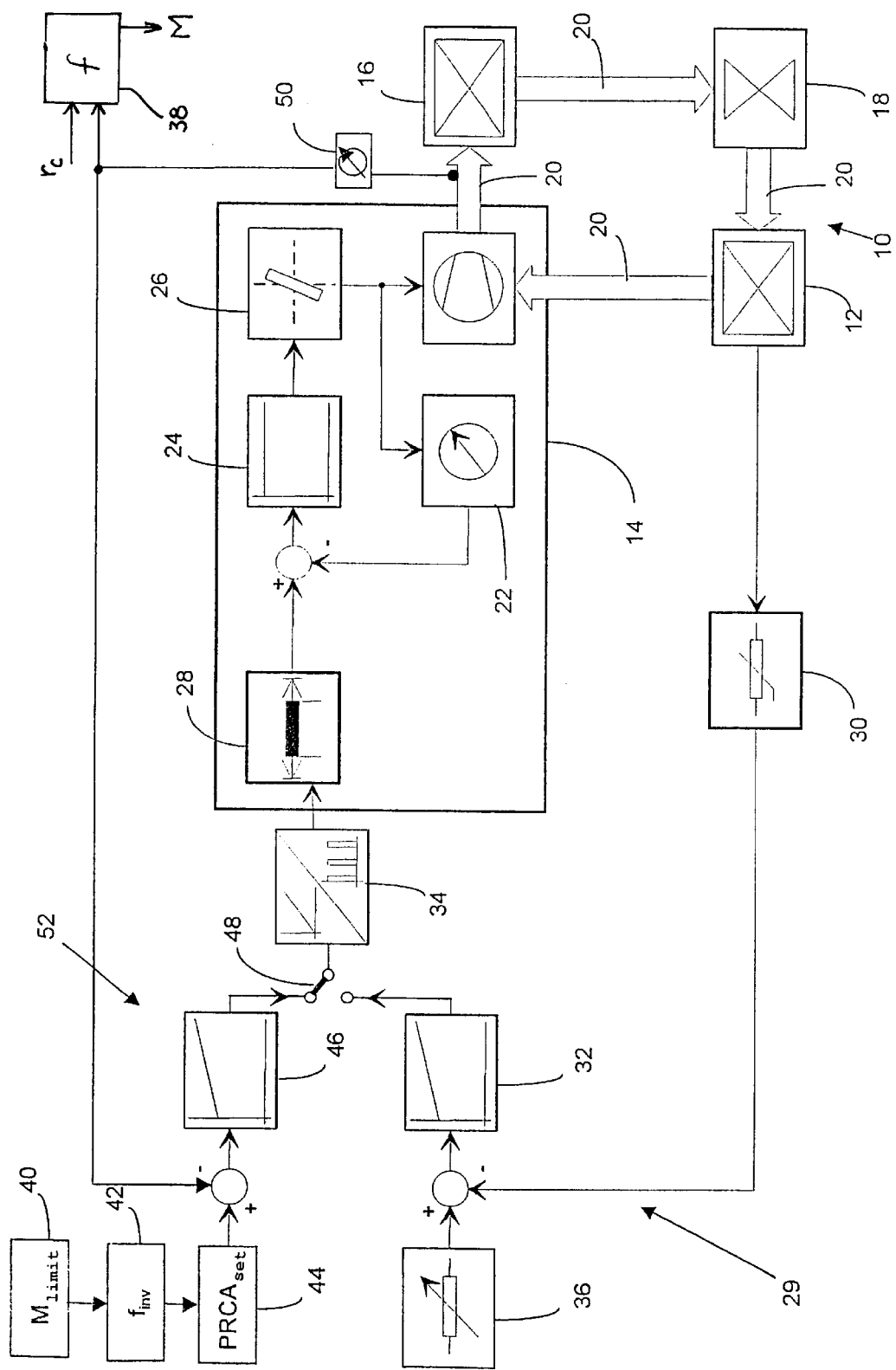
FIG. 1 is a schematic block diagram of the control system of a refrigerant circuit according to the invention.

According to the invention, the instantaneous load torque of the compressor is represented as a function of variables and, with the aid of this function and using the associated inverted function, an activating signal for the compressor is determined as a function of the predetermined maximum limiting torque. In this way, even if the load torque is restricted, for example, by the engine controller, to a maximum value, the compressor can be driven in the above-described driving situations in which high engine power is necessary. In this case, the air-conditioning system is operated at reduced power, specifically in such a manner that the load torque corresponds to the limiting torque prescribed by the engine control device. As a result, even in the above-mentioned driving situations using high engine power, the air-conditioning system can be operated, although at reduced power, but nevertheless at the maximum power permitted by the particular limiting torque.

By reducing the compressor power to a permissible extent, which is prescribed by the engine controller, the method according to the invention has the effect that improvements in the comfort in the air-conditioning system are brought about, and a complete shutdown can in many cases be avoided.

Similarly, improvements in comfort are brought about by avoiding or reducing compressor switching-on processes. The engine functions, such as engine concentricity running characteristics or idling characteristics, are improved. Also, precise coordination between the load torque measured and the engine controller enables savings on fuel.

The instantaneous load torque, which is compared with the limiting torque, is advantageously calculated from the above-mentioned function, and the function is advantageously stored as a characteristic diagram, map or look-up table in a control device of the air-conditioning system. The inverted function can then be taken directly from the stored data in a simple manner too.

In one preferred embodiment of the invention, the instantaneous load torque is determined at least as a function of the high pressure on the output side of the compressor, and of the compressor speed. Advantageously, it is then possible for the control signal to be produced from the high pressure on the output side of the compressor, with the high pressure being determined from the inverted function at a predetermined limiting torque.

In an air-conditioning system which operates with a newer type of refrigerant, for example, $CO_2$, it is advantageous if the load torque is determined at least as a function of a suction pressure on the input side of the compressor, together with the compressor speed. In this case, in the event of high engine power and restriction of the load torque, the control signal is produced from the suction pressure on the output side of the compressor, with this pressure being determined from the inverted function.

In a further preferred embodiment of the invention, a complete shutdown of the compressor can take place in certain limiting situations, for example, as a function of further parameters, such as the evaporator temperature. Thus, for example, at excessive evaporator temperature, operation of the air-conditioning system is no longer useful and the compressor should be shut down.

The invention will be explained below in terms of certain preferred exemplary embodiments, with reference to the drawings.

A refrigeration circuit 10 of an air-conditioning system of a motor vehicle has an evaporator 12, a compressor 14, a condenser 16 and an expansion valve 18, which are connected to one another via corresponding refrigerant lines 20.

With reference to the block diagram, FIG. 1 illustrates the control system for the refrigeration circuit 10 together with its compressor 14. The individual components (explained further below) of the control system are essentially software and hardware components of a control device (not illustrated in greater detail) of the air-conditioning system. The compressor 14 of this exemplary embodiment comprises an internal suction-pressure control device. For this device, the actual value of the suction pressure is determined using a suction-pressure measuring device 22 and is supplied in the form of a control variable to a suction-pressure controller 24, by means of which the working volume 26 of the (variable volume) compressor 14 is adjusted. A control valve 28 supplies a set-point value of the suction pressure to the suction-pressure controller 24, and the control valve 28 is activated as follows.

During normal operation, the refrigeration circuit 10 is controlled via an evaporator-temperature controller 29. The evaporator temperature is determined by a measuring device 30 and is supplied in the form of a control variable to an evaporator-temperature controller 32. The signal of controller 32 is converted at 34 into a pulse-width modulated signal and is supplied to the control valve 28. The set-point value 36 for the evaporator temperature is an operand of a higher-level air-conditioning control means.

During running operation of the air-conditioning system, the load torque M of the compressor 14 is determined continuously using a function which is advantageously stored as a characteristic diagram or map 38, as seen for example in FIG. 2 in pictorial form. Function variables are preferably compressor speed $r_c$, which is prescribed by the engine speed, and the high pressure of the refrigerant $PRCA_{act}$ downstream of the compressor 14. It is possible for this high pressure to be set and measured (reference number 50) in accordance with the evaporator-temperature controller 29. The characteristic diagram or map 38 illustrated in FIG. 2 is limited to only three dimensions, since these are all that can be illustrated graphically. However, it is also possible that the torque M can be calculated as a function of further variables, for example, a pulse-width modulation set point PWM and/or the voltage of an evaporator blower $U_g$ of the air-conditioning system. The load torque M can then be determined more precisely, if desired. The load torque M is in such a case determined as a function of $PRCA_{act}$, $r_c$, PWM and $U_G$, with the result that $$M=f(PRCA_{act}, r_c, PWM, U_G)$$

Furthermore, a maximum limiting torque $M_{limit}$ is prescribed, for example, by an engine controller, and the calculated load torque M is compared with the limiting torque $M_{limit}$. If the load torque M is greater that the limiting torque $M_{limit}$, then the evaporator-temperature controller 29 is shut down by switching over a switch 48, and the refrigeration circuit 10 is controlled as follows.

By means of the limiting torque $M_{limit}$ (reference number 40) and using the inverted function $f_{inv}$, which is related to the above-mentioned function f and can be determined numerically from the characteristic diagram or map 38 in a calculation step 42, an activating or control signal is determined in a further calculation step 44. The function $f_{inv}$ is related to the function f by $f(f_{inv}(x))=x$, or $f_{inv}(f(x))=x$. Thus, by way of example but not by way of limitation, if f is the natural logarithmic (ln) function, $f_{inv}$ would be the exponential (exp) function. The characteristic diagram or map 38 in FIG. 2 can be represented by an equation or function in a manner known to those skilled in the art (e.g., using a curve-fitting technique), whereby the inverse function can be readily obtained by those skilled in the art using known mathematical principles. The activating signal is preferably produced from a set-point value $PRCA_{set}$ for the high pressure of the refrigerant downstream of the compressor, with the result that the desired value of the high pressure of the refrigerant $PRCA_{set}$ is obtained as follows $$PRCA_{set}=f_{inv}(M_{limit}, r_c, PWM, U_G)$$

This determination of the set-point value of the high pressure of the refrigerant $PRCA_{set}$ can be determined numerically using the predetermined and stored characteristic diagram or map 38.

The signal corresponding to the desired value of the high pressure of the refrigerant $PRCA_{set}$ is supplied together with the actual value of the high pressure of the refrigerant $PRCA_{act}$, which is measured between the compressor 14 and condenser 16 by a measuring device 50, to a high-pressure controller 46 and converted at 34 into a pulse-width modulated signal which is supplied to the control valve 28 of the compressor 14.

The refrigerant circuit 10 is therefore controlled on the high-pressure side taking the limiting torque $M_{limit}$ into consideration.

During operation of the air-conditioning system, when the limiting value $M_{limit}$ is exceeded, the evaporator-temperature controller 29 therefore merges seamlessly into a high-pressure controller 52, which limits the torque and has a corresponding set-point value prescription for the high pressure.

The above-mentioned control system relates to control during running operations. When the air-conditioning system is switched on, i.e., when the compressor 14 is switched on, the rise in the high pressure PRCA and the drop in the (internally controlled) suction pressure are equally taken into account, as in the normal operating case for calculation of torque at any moment, and passed on to the engine control device.

If further parameters, for example, the evaporator temperature, reach impermissible values (if, for example, the evaporator temperature rises to too high a level), according to a further embodiment of the invention, the control system is configured in such a manner that in these cases the compressor will in any case be completely shut down.

An example of how the compressor is controlled using the characteristic diagram or map 38 as shown in FIG. 2 is provided hereinbelow. For this example, the load torque M is determined as a function of $r_c$ and PRCA. Now, at a given instant in time, if $r_c$ is computed to be 2500/min and $PRCA_{act}$ is computed to be 15 bar, then the load torque M is determined to be 15, using the characteristic diagram or map 38 of FIG. 2. Now, if $M_{limit}$ is 12, then the compressor will be controlled by way of the present invention, since M is greater than $M_{limit}$. $PRCA_{set}$ is computed by the function $f_{inv}$, and can be determined numerically from the characteristic diagram or map 38 of FIG. 2. With $M_{limit}$ equal to 12 and $r_c$ equal to 2500/min, then $PRCA_{set}$ is computed as 12.5, using the example of FIG. 2. The $PRCA_{act}$ value of 15 is subtracted from the $PRCA_{set}$ value of 12.5, and then the resultant value is supplied to the high-pressure controller 46, to be then converted into a pulse-width modulated signal which is supplied to the control valve 28 of the compressor, as shown by the block diagram of FIG. 1.

If, instead of a conventional refrigerant such as R134a, a different, newer type of refrigerant, for example, $CO_2$, is used, the method according to the invention for controlling the compressor can also be used, in principle. In this case, the load torque M is calculated from other variables on account of the different construction of a $CO_2$ refrigeration circuit and the associated control system. Suitable variables for the function of calculating the load torque include, for example, the air mass flow in the air-conditioning device, the air inlet temperature, the temperature of the air after the evaporator, the moisture entering into the air-conditioning device, the compressor speed and the ratio of the high pressure of the refrigerant downstream of the compressor to the suction pressure of the refrigerant upstream of the compressor.

Using the associated inverted function, in the case of this alternative refrigeration circuit, with a predetermined limiting torque $M_{limit}$, the suction pressure of the refrigerant upstream of the compressor now becomes the control variable with the associated set-point value. This results in the set-point value of the suction pressure of the refrigerant upstream of the compressor being produced as a function of the limiting torque, the air mass flow, the air inlet temperature, the temperature of the air downstream of the evaporator, the moisture, the compressor speed and the high pressure of the refrigerant downstream of the compressor.

The foregoing description of preferred embodiments of the invention has been presented for purposes of illustration and description only. It is not intended to be exhaustive or to limit the invention to the precise form disclosed, and modifications and variations are possible and/or would be apparent in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto and that the claims encompass all embodiments of the invention, including the disclosed embodiments and their equivalents.

What is claimed is:

1. A method for controlling a compressor in a refrigerant circuit of an air-conditioning system in a motor vehicle driven by an engine, comprising:
    determining an instantaneous load torque (M) of the compressor as a function (f) of at least one variable;
    determining a predetermined maximum limiting torque ($M_{limit}$) as a function (f) of at least one variable and based on parameters set by a controller of the engine;
    comparing M with $M_{limit}$, and if $M > M_{limit}$;
    using an inverted function ($f_{inv}$) which is derived from function (f) to generate a control signal for the compressor based on $M_{limit}$; and
    controlling the compressor based at least in part on the generated control signal.

2. A method as claimed in claim 1, wherein the instantaneous load torque (M) is calculated from the function (f) as a function of at least one variable selected from refrigerant pressure on the high-pressure side of the compressor (PRCA), compressor speed ($r_c$), evaporator blower voltage ($u_g$) and a pulse width modulation set point (PWM).

3. A method as claimed in claim 1, wherein the function (f) is stored as a characteristic diagram or map.

4. A method as claimed in claim 2, wherein the instantaneous load torque (M) is determined at least as a function of the instantaneous high pressure ($PRCA_{act}$) on the output side of the compressor, and the compressor speed ($r_c$).

5. A method as claimed in claim 1, wherein the control signal is produced from a predetermined set-point high pressure ($PRCA_{set}$) on the output side of the compressor, and this high pressure is determined from the inverted function.

6. A method as claimed in claim 1, wherein the instantaneous load torque (M) is determined at least as a function of suction pressure on the input side of the compressor, and the compressor speed.

7. A method as claimed in claim 6, wherein the control signal is produced from the suction pressure on the input side of the compressor, and the input-side suction pressure is determined from the inverted function.

8. A method as claimed in claim 1, further comprising controlling operation of the compressor as a function of at least one further parameter.

9. A method as claimed in claim 8, wherein said at least one further parameter comprises a measured temperature of an evaporator in the air-conditioning circuit.

10. A method as claimed in claim 1, wherein the generated control signal provides for operation of the compressor at least at a minimum level of operation.

11. A method as claimed in claim 10, further comprising controlling operation of the compressor as a function of at least one further parameter and wherein the further controlling is capable of overriding the generated control signal and shutting down the compressor.

12. A control system for controlling a compressor in a refrigerant circuit of an air-conditioning system in a motor vehicle driven by an engine, comprising:
    a circuit for determining an instantaneous load torque (M) of the compressor as a function (f) of at least one variable, wherein function (f) is stored in a look-up table;
    a circuit for determining a predetermined maximum limiting torque ($M_{limit}$) as a function (f) of at least one variable and based on parameters set by a controller of the engine;

a comparator for comparing M with $M_{limit}$;

a circuit for generating, when $M>M_{limit}$ and using an inverted function ($f_{inv}$) which is derived from function (f), a control signal for the compressor based on $M_{limit}$; and a control circuit for controlling the compressor based at least in part on the generated control signal.

13. A system as claimed in claim 12, wherein the instantaneous load torque (M) calculation circuit calculates (M) from the function (f) as a function of at least one variable selected from refrigerant pressure on the high-pressure side of the compressor (PRCA), compressor speed ($r_c$), evaporator blower voltage ($u_g$) and a pulse width modulation set point (PWM).

14. A system as claimed in claim 13, wherein the instantaneous load torque (M) is determined at least as a function of the instantaneous high pressure ($PRCA_{act}$) on the output side of the compressor, and the compressor speed ($r_c$).

15. A system as claimed in claim 12, wherein the control signal is produced from a predetermined set-point high pressure ($PRCA_{set}$) on the output side of the compressor, and this high pressure is determined from the inverted function.

16. A system as claimed in claim 12, wherein the instantaneous load torque (M) is determined at least as a function of suction pressure on the input side of the compressor, and the compressor speed.

17. A system as claimed in claim 16, wherein the control signal is produced from the suction pressure on the input side of the compressor, and the input-side suction pressure is determined from the inverted function.

18. A system as claimed in claim 12, further comprising a circuit for controlling operation of the compressor as a function of at least one further parameter.

19. A system as claimed in claim 18, wherein said at least one further parameter comprises a measured temperature of an evaporator in the air-conditioning circuit.

20. A system as claimed in claim 12, wherein the generated control signal provides for operation of the compressor at least at a minimum level of operation.

21. A system as claimed in claim 20, wherein the controller further controls operation of the compressor as a function of at least one further parameter and wherein the further controlling is capable of overriding the generated control signal and shutting down the compressor.

22. A system as claimed in claim 21, wherein said at least one further parameter comprises a measured temperature of an evaporator in the air-conditioning circuit.

23. A motor vehicle driven by an engine, comprising an air-conditioning system having a refrigerant circuit including a compressor and a control system for controlling the compressor as defined by claim 12.

* * * * *